Aug. 22, 1933.  A. E. GLANCY  1,923,572
OPHTHALMIC LENS
Filed Nov. 2, 1929
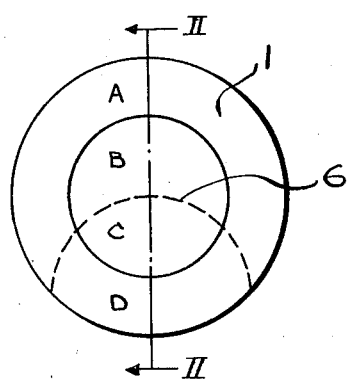
Fig. I.
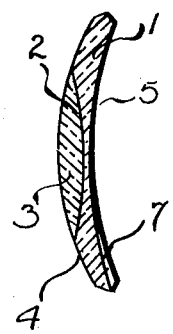
Fig. II
Anna E. Glancy  Inventor
By Harry H. Styll
Attorney Patented Aug. 22, 1933

1,923,572

UNITED STATES PATENT OFFICE 1,923,572

OPHTHALMIC LENS

Anna E. Glancy, Southbridge, Mass., assignor to American Optical Company, Southbridge, Mass., a voluntary association of Massachusetts Application November 2, 1929. Serial No. 404,373

3 Claims. (Cl. 88—54)

This invention relates to improvements in ophthalmic lenses and has particular reference to lenses having a plurality of fields and to the process of producing the same.

The principal object of this invention is to provide a lens having a plurality of fields arranged in such order of powers that the wearer will be rendered universally efficient service.

Another object of the invention is to provide means whereby the field or fields most used will be of ample size and not limited by an unnecessary large field for those of lesser use.

Another object of the invention is to provide a reading field in a multifocal lens having very little color and prismatic error at the boundary line without adding to the steps in the process.

Another object of the invention is to provide a lens having two of its fields so arranged that their powers may be interchanged on different lenses, thus making the arrangement of fields flexible to suit the individual choice of the wearer.

Another object of the invention is to provide fields within the lens whose individual powers may be changed without changing their relative positions in the scale of powers of all the fields.

Another object is to form the lens with the improved features in a simple and economical manner.

Other objects and advantages of the invention will become apparent from the following description taken in connection with the accompanying drawing, and it will be apparent that many changes may be made in the details of construction, arrangement of parts and steps of the process without departing from the spirit of the invention as expressed in the accompanying claims. I, therefore, do not wish to be limited to the exact details shown and described as the preferred forms only have been shown by way of illustration.

In the drawing:

Fig. I is a front view of a lens embodying the invention.

Fig. II is a section on line II—II of Fig. I.

Very few of the multifocal lenses which have been in use for a great many years have had a plurality of fields positioned in the most beneficial arrangement. Of these few the majority have either been made by fusing or otherwise joining together a plurality of pieces of glass of different indices of refraction and obtaining the various powers required throughout the lens by means of the different glasses used. This process has necessarily been an elaborate and expensive one as the mingling of these different glasses required constant care and attention coupled with great skill. It was also a bad feature of these lenses that their flexibility in the matter of arrangement of fields and powers was very limited as the relative powers were set by the indices of refraction of the different glasses used.

It is the prime object of my invention, therefore, to provide a multifocal lens which in its method of construction will depart entirely from the methods of the prior art and provide a lens in which the fields themselves and their powers can be arranged and adjusted according to individual cases.

Referring to the drawing wherein similar reference characters denote corresponding parts throughout the several views, the numeral 1 denotes the blank upon which I form my improved lens. The blank 1 is preferably of crown glass formed to the shape desired, such as a meniscus, by molding or other suitable method. I next form a countersink 2 in the convex side 4 of the molded blank and finish the countersunk surface 2 to an optical finish. I preferably form the countersink with its center on the geometrical center of the lens blank but this is not essential. I next fuse into the countersink 2 a segment or button of glass 3 having a different index of refraction to that of the lens blank. As the blank was made of crown glass the button 3 may well be made of flint glass. Having united the flint button into the crown glass major portion, I next finish the convex surface 4 to an optical curvature. On the concave side 5, I surface another optical curvature to give the desired power to the lens and within the field of the fused in segment 3 with its upper line of joinder 6 preferably coincident with the geometrical center of the lens I surface another curvature 7 on the concave side. The curves are preferably computated so that the portion marked A will be the distance field, the portion marked B will be an intermediate field, the portion marked C will be a reading field, and the portion marked D will be another intermediate field. The two intermediate fields are actually intermediate in power between the distance and the reading powers. They may be equal but are not so necessarily, and to obtain the best results of the invention they are preferably unequal, but there is a relation between them.

If, for example, the reading addition is plus 2 diopters and either of the intermediate additions is plus 0.50 diopters the other intermediate addition is necessarily plus 1.50 diopters. The sum of the two must equal the power of the reading addition.

It will be apparent that this characteristic makes a very flexible lens, one intermediate field being used for objects on a desk and the other for going down stairs. It will be apparent from the above example that the powers of the two intermediate fields may be varied at will and interchanged if desired. The reading portion C is formed by the fused segment in combination with the curve 7 on the concave side. This segment may, therefore, be of weaker power than would be required if the segment were omitted from the concave side; hence there is less chromatic aberration and less prismatic disturbance at the boundary of the two fields B and C than there would be for a fused segment of the same size and full amount of the addition. The improved lens, therefore, has a bifocal feature within the area of a fused segment.

Another feature of this improved lens is the fact that by a combination of the above principles a toric countersink may be formed before fusing in the segment 3. The toric countersink will function to neutralize the astigmatism in the center portion. Astigmatism of the eye cannot in a fused lens be very well corrected due to the different glasses used in the lens.

From the method of construction outlined it will be apparent that the lens is monaxial at the geometrical center for all the fields but it will be apparent that the geometrical center need not coincide with this point, and it is also not essential that the monaxial merged point of tangency shall be in the geometrical center of the segment 3.

If the field D is not required it will be apparent that the lens may be cut with its lower edge coinciding with the lower edge of the segment 3 and in this case a three field lens would result.

The invention may also be applied to a one-piece lens if desired as the segmental portion 3 could equally well be formed from the crown glass blank 1 instead of being fused in as described.

From the foregoing description it will be apparent that I have provided a novel lens embodying improvements calculated to be of great benefit to wearers of multifocal lenses and the means of carrying out these objects are of an efficient and economical nature. It will be particularly noted that the various fields are not restricted as regards position in their relative powers, as different kinds of glass are not used for each field as in the prior art but the various powers are obtained by the choice of curves.

Having described my invention, I claim:

1. A multifocal lens having a curvature on one side thereof, a second curvature surfaced on the first, an inserted portion on the side opposite said curvatures overlying a portion of both, and a curvature surfaced on the side containing the inserted portion giving four fields of different power within the lens.

2. A multifocal lens having a curvature on one side thereof, a second curvature surfaced on the first with the upper line of joinder passing through the geometrical center of the lens, an inserted portion on the side opposite said curvatures overlying a portion of both, and a curvature surfaced on the side containing the inserted portion giving four fields of different power within the lens, all being monaxial at the said geometrical center.

3. A multifocal lens having a curvature on one side thereof, a second curvature surfaced on the first, a circular optical field on the side opposite said curvatures overlying a portion of both of said curvatures, and a second optical field of different power surrounding said circular optical field and on the same side of the lens giving four fields of different power within the lens.

ANNA E. GLANCY.